United States Patent
Kim et al.

(10) Patent No.: US 12,452,019 B2
(45) Date of Patent: Oct. 21, 2025

(54) METHOD AND DEVICE FOR TRANSMITTING/RECEIVING CSI-RS IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 312 days.

(21) Appl. No.: 17/998,319

(22) PCT Filed: May 12, 2021

(86) PCT No.: PCT/KR2021/005915
§ 371 (c)(1),
(2) Date: Nov. 9, 2022

(87) PCT Pub. No.: WO2021/230640
PCT Pub. Date: Nov. 18, 2021

(65) Prior Publication Data
US 2023/0239114 A1    Jul. 27, 2023

(30) Foreign Application Priority Data
May 13, 2020    (KR) .......... 10-2020-0057266

(51) Int. Cl.
*H04L 5/00*    (2006.01)
*H04W 72/232*    (2023.01)

(52) U.S. Cl.
CPC ......... *H04L 5/0053* (2013.01); *H04W 72/232* (2023.01)

(58) Field of Classification Search
CPC ... H04W 28/04; H04W 72/04; H04W 72/042; H04W 88/08; H04W 72/232; H04L 5/0007; H04L 5/0053
(Continued)

(56) References Cited

U.S. PATENT DOCUMENTS

| | | | |
|---|---|---|---|
| 11,765,755 B2* | 9/2023 | Bang .................... | H04W 48/12 370/329 |
| 11,777,578 B2* | 10/2023 | Chen .................... | H04L 5/0094 370/329 |

(Continued)

OTHER PUBLICATIONS

3GPP TSG RAN WG1 Meeting #100bis-e, e-Meeting, Apr. 20-30, 2020, R1-2001596, Source: ZTE, Title: Maintenance of multi-TRP enhancements, Agenda Item: 7.2.6.2. (Year: 2020).*

(Continued)

*Primary Examiner* — Peter G Solinsky
*Assistant Examiner* — Sanjay K Dewan
(74) *Attorney, Agent, or Firm* — LEE, HONG, DEGERMAN, KANG & WAIMEY

(57) ABSTRACT

A method and a device for transmitting/receiving a CSI-RS in a wireless communication system are disclosed. A method for receiving an aperiodic channel state information-reference signal (CSI-RS), according to one embodiment of the present disclosure, may comprise steps of: receiving, from a base station, downlink control information (DCI) for triggering the aperiodic CSI-RS; and receiving, from the base station, the aperiodic CSI-RS on the basis of the DCI, wherein, on the basis the scheduling offset of the aperiodic CSI-RS being smaller than the beam switch timing of a terminal, a quasi co-location (QCL) assumption of a downlink signal associated with the same CORESET pool index as the CORESET pool index of a control resource set (CORESET) for the DCI can be applied for the reception of the aperiodic CSI-RS.

11 Claims, 12 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,785,536 | B2* | 10/2023 | Papasakellariou | H04L 5/0053 370/329 |
| 2020/0145982 | A1* | 5/2020 | Cheng | H04W 72/23 |
| 2023/0106730 | A1* | 4/2023 | Chen | H04L 5/0064 370/329 |
| 2023/0108044 | A1* | 4/2023 | Zhang | H04L 5/0091 370/329 |
| 2023/0232313 | A1* | 7/2023 | Ji | H04B 7/063 370/329 |
| 2023/0254815 | A1* | 8/2023 | Khoshnevisan | H04W 72/046 370/329 |
| 2023/0299916 | A1* | 9/2023 | Muruganathan | H04L 5/0094 370/329 |

OTHER PUBLICATIONS

3GPP TSG RAN WG1 Meeting #100-Bis-e, Apr. 20-Apr. 30, 2020, R1-2002552, Agenda item: 7.2.6.3, Source: Qualcomm Incorporated, Title: Enhancements of Multi-beam Operation, Title: Enhancements of Multi-beam Operation. (Year: 2020).*

3GPP TSG RAN WG1 #100b, e-Meeting, Apr. 20-30, 2020, R1-2002337, Agenda Item: 7.2.6.2, Source: Apple Inc., Title: Remaining Issues for Multi-TRP Enhancement. (Year: 2020).*

3GPP TSG RAN WG1 #100bis, e-Meeting, Apr. 20-30, 2020, R1-2001678, Source: vivo, Title: Discussion on remaining issues on multi-TRP operation, Agenda Item: 7.2.6.2. (Year: 2020).*

PCT International Application No. PCT/KR2021/005915, International Search Report dated Aug. 12, 2021, 5 page.

ZTE, "Maintenance of multi-TRP enhancements," R1-2001596, 3GPP TSG RAN WG1 Meeting #100bis-e, e-Meeting, Apr. 2020, 14 pages.

Vivo, "Discussion on remaining issues on multi-TRP operation," R1-2001678, 3GPP TSG RAN WG1 #100bis, e-Meeting, Apr. 2020, 18 pages.

Qualcomm Incorporated, "Enhancements on Multi-beam Operation," R1-2002552, 3GPP TSG RAN WG1 Meeting #100-Bis-e, Apr. 2020, 9 pages.

Apple Inc., "Remaining Issues for Multi-TRP Enhancement," R1-2002337, 3GPP TSG RAN WG1 #100b, e-Meeting, Apr. 2020, 18 pages.

Korean Intellectual Property Office Application No. 10-2022-7039150 Office Action dated Jan. 24, 2025, 4 pages.

Vivo, "Remaining issues on aperiodic CSI-RS triggering," 3GPP TSG RAN WG1 #100bis e-Meeting, R1-2001690, Apr. 2020, 6 pages.

Oppo, "Summary of email thread [100b-e-NR-eMIMO-multiTRP-01]," 3GPP TSG RAN WG1 #100bis e-Meeting, R1-2002936, Apr. 2020, 17 pages.

Korean Intellectual Property Office Application No. 10-2022-7039150, Notice of Allowance dated Sep. 10, 2025, 2 pages.

Moderator (Nokia), "FL summary on aperiodic CSI-RS triggering with different numerology between CSI-RS and triggering PDCCH—Email discussion conclusion," 3GPP TSG RAN WG1 #100bis, R1-2002841, Apr. 2020, 18 pages.

Nokia et al., "Outcome of email thread [100e-NR-LTE_NR_DC_CA_enh-X-CC-A-CSI-RS-02]," 3GPP TSG RAN WG1 #100, R1-2001351, Feb. 2020, 3 pages.

* cited by examiner

METHOD AND DEVICE FOR TRANSMITTING/RECEIVING CSI-RS IN WIRELESS COMMUNICATION SYSTEM

CROSS-REFERENCE TO RELATED APPLICATION(S)

This application is the National Stage filing under 35 U.S.C. 371 of International Application No. PCT/KR2021/005915, filed on May 12, 2021, which claims the benefit of earlier filing date and right of priority to Korean Application No. 10-2020-0057266, filed on May 13, 2020, the contents of which are all hereby incorporated by reference herein in their entireties.

TECHNICAL FIELD

The present disclosure relates to a wireless communication system, and in more detail, relates to a method and an apparatus of transmitting and receiving a channel state information reference signal (CSI-RS) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a CSI-RS in a wireless communication system supporting multiple multi-transmission reception point (TRP).

In addition, an additional technical object of the present disclosure is to provide a method and an apparatus of determining a beam (or QCL assumption) for reception of an aperiodic CSI-RS.

The technical objects to be achieved by the present disclosure are not limited to the above-described technical objects, and other technical objects which are not described herein will be clearly understood by those skilled in the pertinent art from the following description.

A method of receiving an aperiodic channel state information-reference signal (CSI-RS) in a wireless communication system according to an aspect of the present disclosure may include: receiving, from a base station, downlink control information (DCI) for triggering the aperiodic CSI-RS; and receiving, from the base station, the aperiodic CSI-RS based on the DCI. Based on a scheduling offset of the aperiodic CSI-RS being smaller than a beam switch timing of the terminal, a quasi co-location (QCL) assumption of a downlink signal associated with the same CORESET pool index as a CORESET pool index of a control resource set (CORESET) for the DCI may be applied for reception of the aperiodic CSI-RS.

A method of transmitting an aperiodic channel state information-reference signal (CSI-RS) in a wireless communication system according to an aspect of the present disclosure may include: transmitting, to a terminal, downlink control information (DCI) for triggering the aperiodic CSI-RS; and transmitting, to the terminal, the aperiodic CSI-RS. Based on a scheduling offset of the aperiodic CSI-RS being smaller than a beam switch timing of the terminal, a quasi co-location (QCL) assumption of a downlink signal associated with the same CORESET pool index as a CORESET pool index of a control resource set (CORESET) for the DCI may be applied for reception of the aperiodic CSI-RS.

According to an embodiment of the present disclosure, it is possible to effectively determine a default reception beam of an aperiodic CSI-RS in a system supporting multiple transmission reception point (TRP) transmission and reception.

In addition, since a default reception beam of an aperiodic CSI-RS transmitted by a specific TRP may follow a CORESET of the corresponding TRP or a transmission configuration indication (TCI) of a downlink signal in a system supporting multiple TRP transmission and reception, it is possible to prevent malfunction of the terminal.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
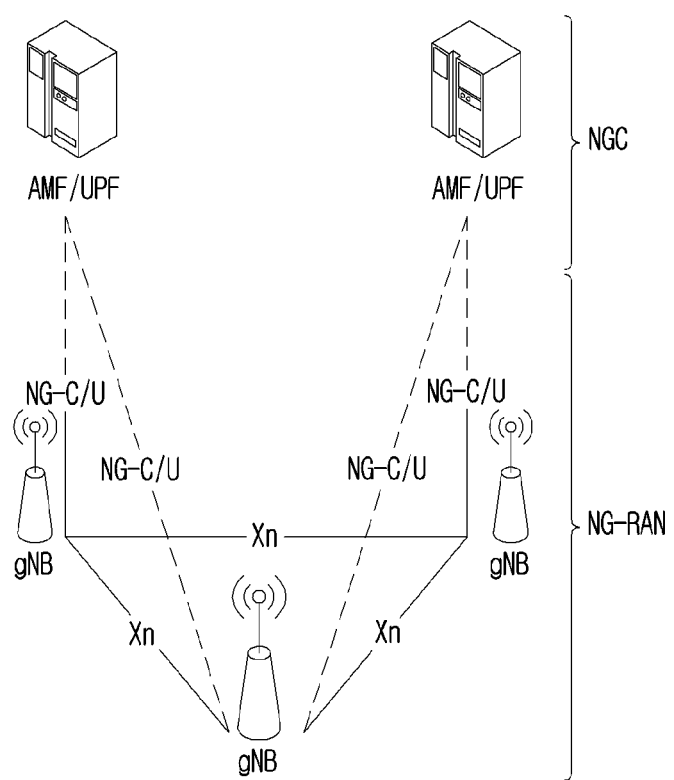
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
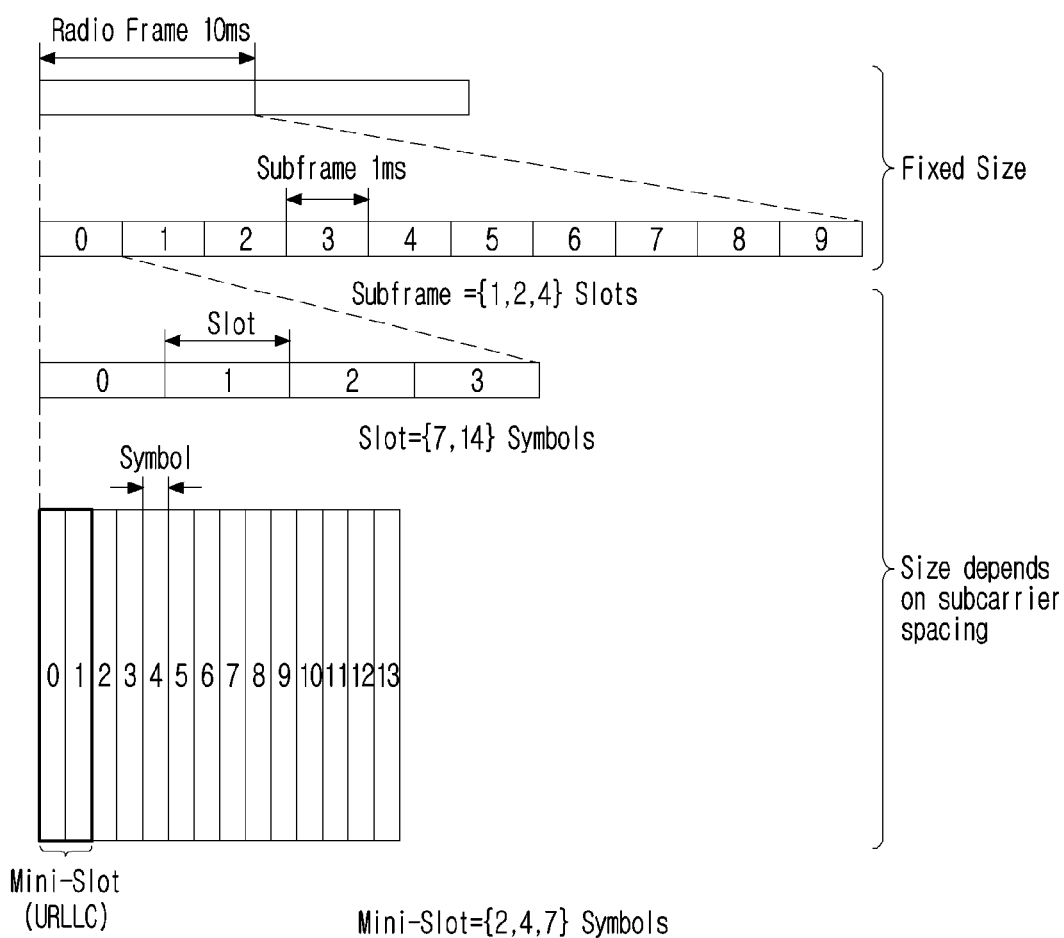
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,\,offset})T_c$ than a corresponding downlink frame in a corresponding terminal starts. For a subcarrier spacing configuration μ, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$) the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{symb}^{frame,\mu}$ | $N_{symb}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{symb}^{frame,\mu}$ | $N_{symb}^{subframe,\mu}$ |
| --- | --- | --- | --- |
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi colocation) relationship. In this case, the large-scale property includes at least one of delay spread, doppler spread, frequency shift, average received power, received timing.

Figure 3:
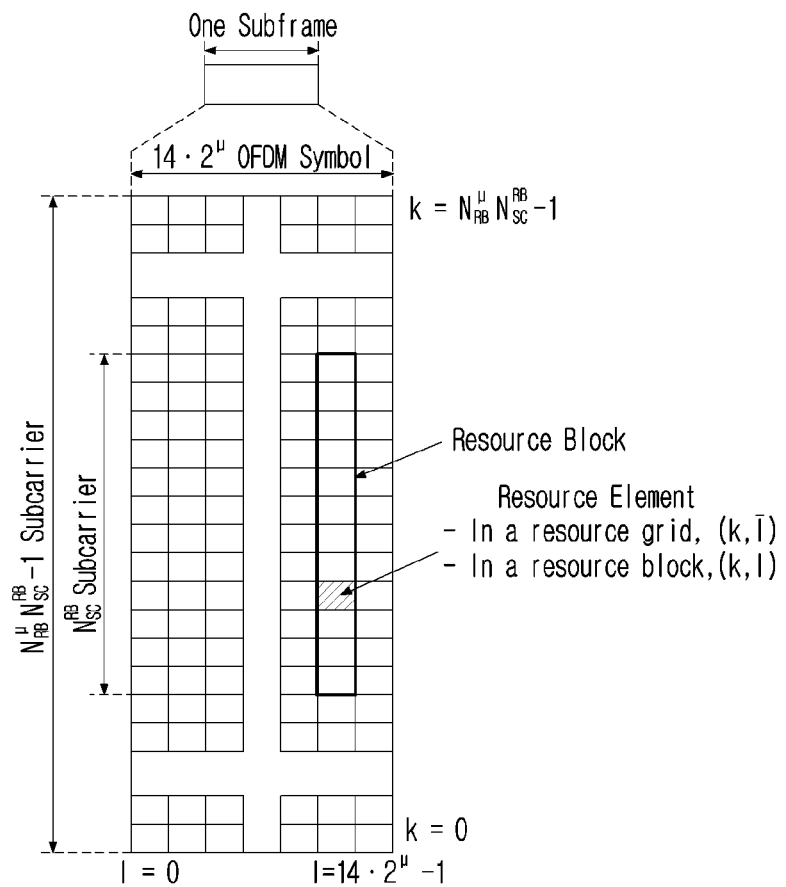
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with 14·2^μ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^{\mu} N_{sc}^{RB}-1$ is an index in a frequency domain and P=0, ..., $2^{\mu} N_{symb}^{(\mu)}-1$ refers to a position of a symbol in a subframe. When referring to a resource element in a slot, an index pair (k,l) is used. Here, l=0, ..., $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu}=n_{PRB}^{\mu}+N_{BWP,i}^{start,\mu} \quad \text{[Equation 2]}$$

$N_{BWP,i}^{start,\mu}$ is a common resource block that a BWP starts relatively to common resource block 0.

Figure 4:
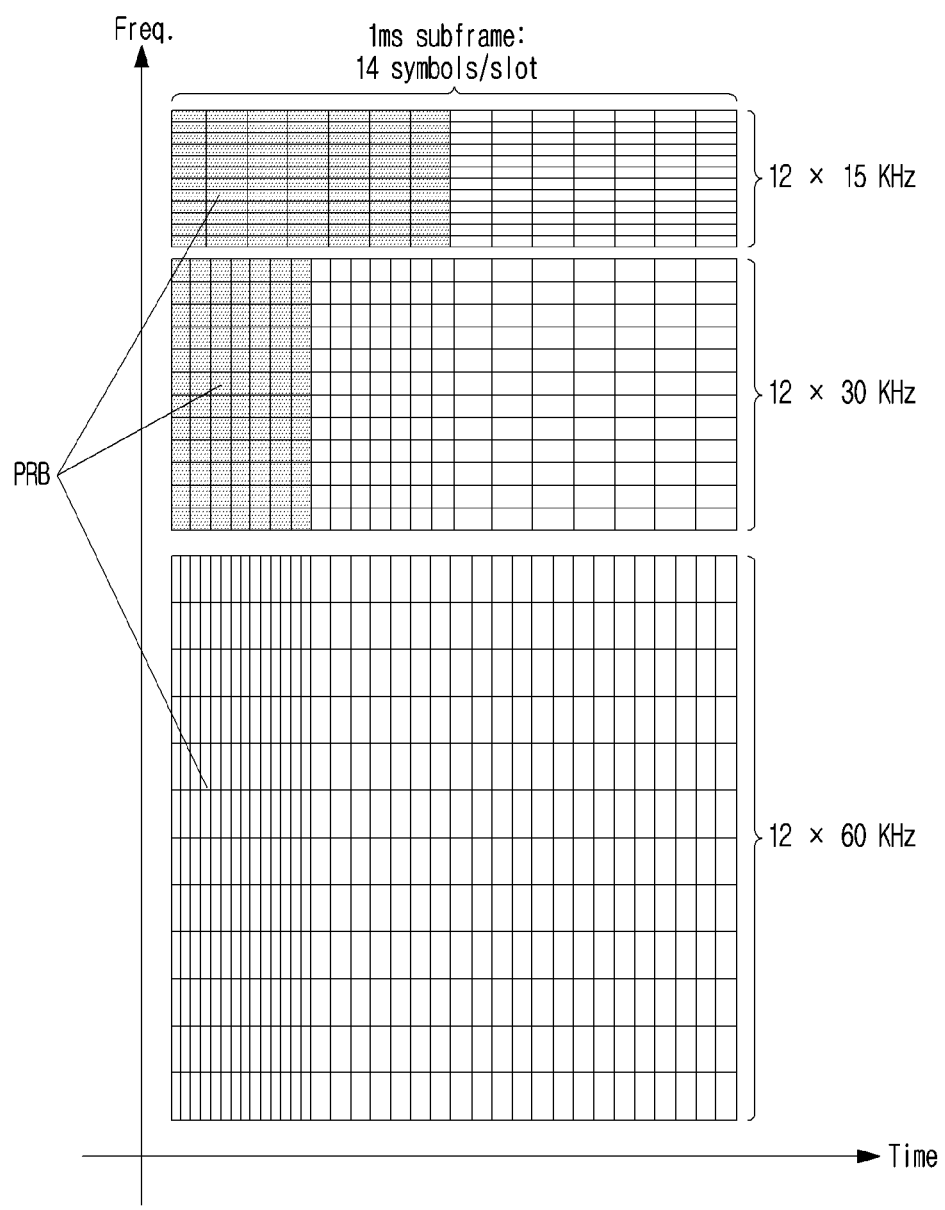
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
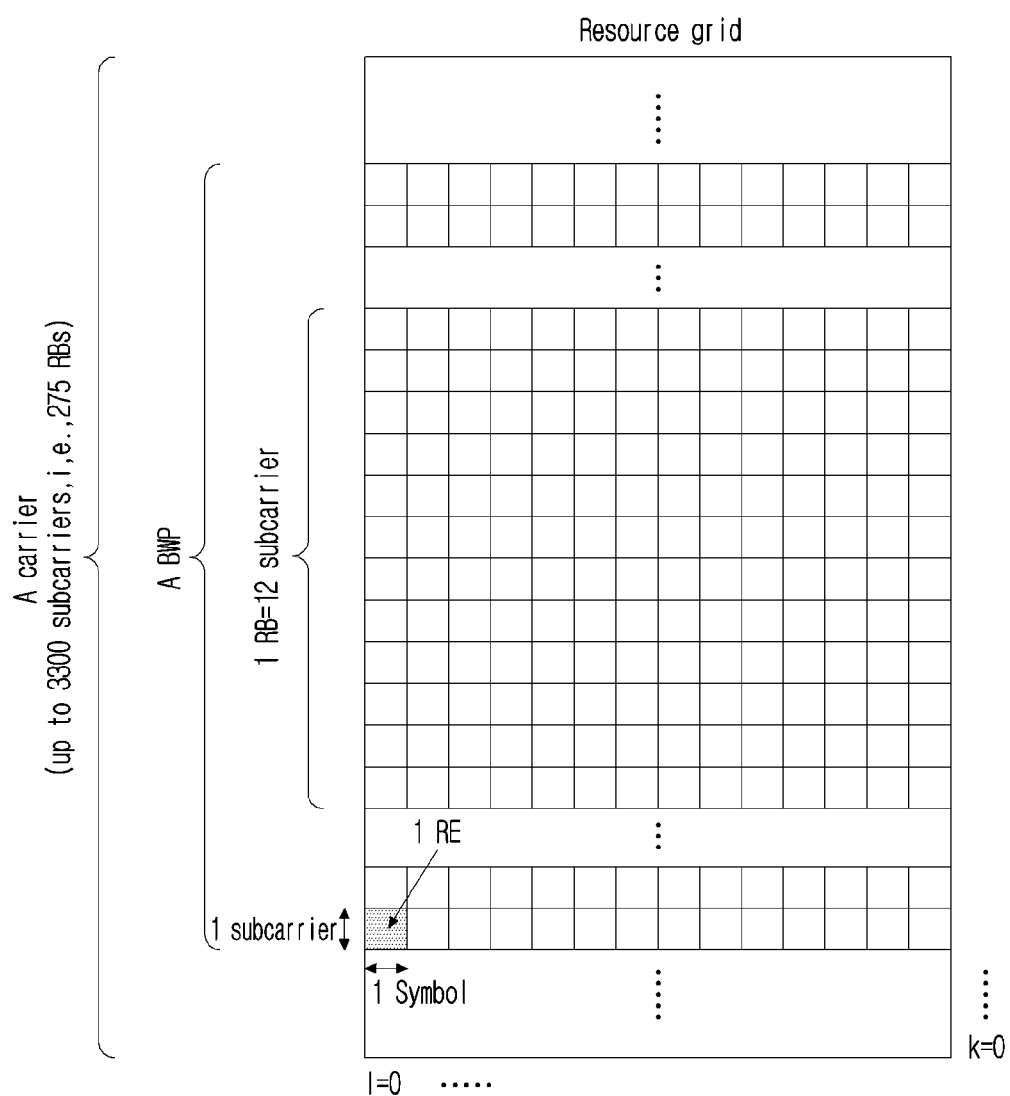
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
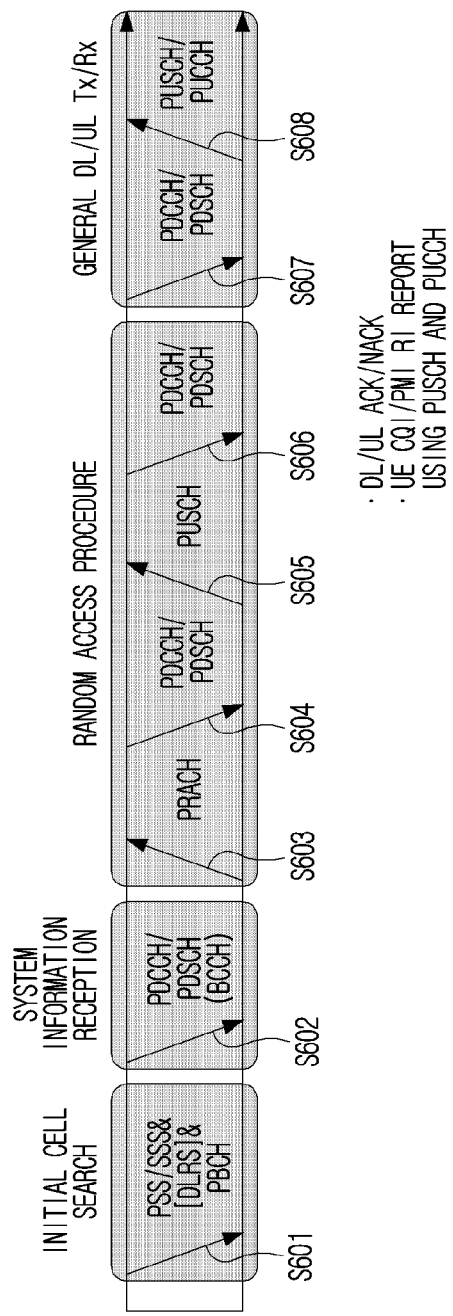
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, ControlResourceSet information element (IE), a higher layer parameter, is used to configure a time/frequency CORESET (control resource set). In an example, the CORESET may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/CORESET-related TCI information, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7:
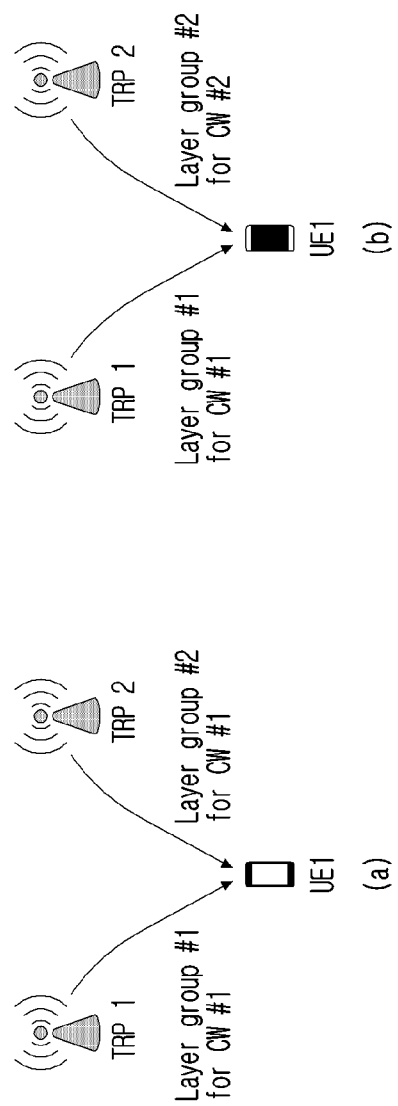
FIG. 7 illustrates a transmission method of multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRPs scheduled by at least one DCI may be performed as follows:

i) Scheme 1 (SDM): n (n is a natural number) TCI states in a single slot in overlapping time and frequency resource allocation Scheme 1a: Each transmission occasion is one layer or a set of layers of the same TB and each layer or layer set is associated with a set of one TCI and one DMRS port(s). A single codeword having one RV (redundancy version) is used for all layers or layer sets. With respect to a UE, different coded bits are mapped to different layers or layer sets by a specific mapping rule.

Scheme 1b: Each transmission occasion is one layer or a set of layers of the same TB and each layer or layer set is associated with a set of one TCI and one DMRS port(s). A single codeword having one RV is used for each spatial layer or layer set. RVs corresponding to each spatial layer or layer set may be the same or different.

Scheme 1c: Each transmission occasion is one layer of the same TB having one DMRS port associated with multiple TCI state indexes or one layer of the same TB having multiple DMRS ports associated with multiple TCI indexes one by one.

For the above-described scheme 1a and 1c, the same MCS is applied to all layers or layer sets.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) are associated with all non-overlapping frequency resource allocation.

Scheme 2a: A single codeword having one RV is used across whole resource allocation. From a viewpoint of UE, common RB mapping (layer mapping of a codeword) is applied across all resource allocation.

Scheme 2b: A single codeword having one RV is used for each non-overlapping frequency resource allocation. RVs corresponding to each non-overlapping frequency resource allocation may be the same or different.

For Scheme 2a, the same MCS is applied to all non-overlapping frequency resource allocation.

iii) Scheme 3 (TDM): n (n is a natural number) TCI states in a single slot in non-overlapping time resource allocation. Each transmission occasion of a TB has one TCI and one RV by time granularity of a mini-slot. All transmission occasion(s) in a slot use a common MCS as the same single or multiple DMRS port(s). A RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) use a common MCS as the same single or multiple DMRS port(s) across K slots. A RV/TCI state may be the same or different among transmission occasions.

A Method for Supporting Multi-TRPs (M-TRPs)

MTRP-URLLC may mean that M-TRPs transmit the same transport block (TB) using different layers/time/frequency. It may be assumed that a UE configured with an MTRP-URLLC transmission method is indicated with multiple TCI state(s) by DCI, and data received using a QCL RS of each TCI state is the same TB. On the other hand, MTRP-eMBB may mean that M-TRPs transmit different TBs using different layers/time/frequencies. It may be assumed that a UE configured with an MTRP-eMBB transmission method is indicated with multiple TCI state(s) by DCI, and data received using a QCL RS of each TCI state are different TBs. In this regard, as a UE separates and uses an RNTI configured for an MTRP-URLLC purpose and an RNTI configured for an MTRP-eMBB purpose, it may be determined/decided whether corresponding M-TRP transmission is the URLLC transmission or the eMBB transmission. That is, when CRC masking of DCI received by a UE is performed using an RNTI configured for an MTRP-URLLC purpose, this may correspond to URLLC transmission, and when CRC masking of DCI is performed using an RNTI configured for an MTRP-eMBB purpose, this may correspond to eMBB transmission.

In the present disclosure, a TRP may mean an antenna array having one or more antenna elements available in a network located in a specific geographic location of a specific area. In the present disclosure, although described with reference to a "TRP" for convenience of description, as described above, a TRP may be understood/applied by being substituted with a base station, a transmission point (TP), a cell (e.g., a macro cell)/a micro cell (small cell)/a pico cell, etc.), an antenna array or a panel, a remote radio unit (RRU)/remote radio head (RRH). In addition, a base station may mean a generic term for an object that transmits and receives data with a terminal. For example, the base station may be a concept including one or more TPs (Transmission Points), one or more TRPs (Transmission and Reception Points), etc.

The present disclosure applies the proposed method by assuming cooperative transmission/reception between 2 TRPs for convenience of description, but it can be extended and applied even in a multi-TRP environment of 3 or more, and it can be also extended and applied in a multi-panel environment. Different TRPs may be recognized as different TCI states to a UE, and the UE receives/transmits data/DCI/UCI using TCI state 1 means receiving/transmitting data/DCI/UCI from/to TRP 1.

In NR, in order to provide flexibility for a PDCCH control region, it is not required to configure the PDCCH control region over a system bandwidth. Accordingly, a time/frequency control resource set (CORESET) for searching for downlink control information (DCI) (or for monitoring a PDCCH) may be configured. A CORESET may be divided into a common CORESET and a UE-specific CORESET. A common CORESET may be configured for multiple UEs in one cell, and a UE-specific CORESET may mean a PDCCH control region defined for a specific UE. The number of CORESETs may be limited to three per BWP, including common CORESETs and UE-specific CORESETs. A search space (set) means a set of PDCCH candidates. In other words, a search space (set) may mean a set of PDCCH candidates decoded at different aggregation levels. Each search space (set) may be associated with one CORESET, and one CORESET may be associated with multiple search spaces (sets). A UE monitors a set of PDCCH candidates in one or more CORESETs on an activated DL BWP on each activated serving cell in which PDCCH monitoring is configured according to corresponding search space sets. Here, monitoring includes the meaning of decoding each PDCCH candidate according to monitored DCI formats.

Hereinafter, in the present disclosure, a method for determining a default beam (or QCL (quasi co-location) configuration or default spatial domain reception filter of an aperiodic (AP) CSI-RS for M-TRP transmission is proposed. More specifically, in the present disclosure, in consideration of M-TRP transmission, when a UE can use a plurality of (default) Rx (reception) beams (at the same time), a method of determining a default beam and/or an as associated CORESET pool index for each type of a DL RS is proposed.

Figure 8:
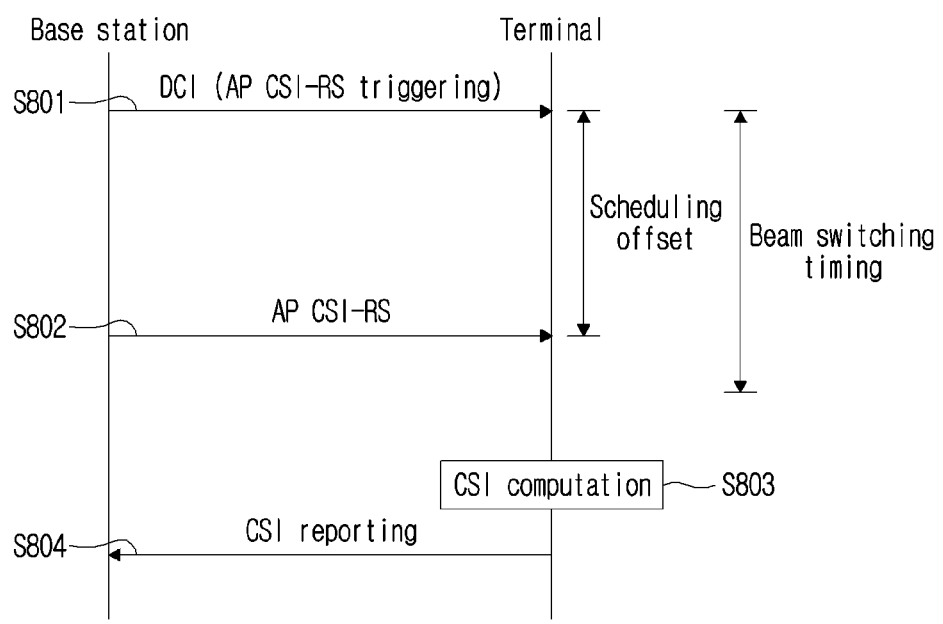
FIG. 8 illustrates a method of transmitting and receiving an aperiodic CSI-RS in a wireless communication system to which the present disclosure may be applied.

FIG. 8 illustrates a method of transmitting and receiving an aperiodic CSI-RS in a wireless communication system to which the present disclosure may be applied.

Referring to FIG. 8, a UE receives DCI triggering an aperiodic (AP) CSI-RS from a base station (S801).

Here, DCI may schedule a PDSCH or a PUSCH together with AP CSI-RS triggering.

In an AP CSI, each trigger state configured using the higher layer parameter CSI-AperiodicTriggerState is associated with one or more CSI reporting settings. CSI-AperiodicTriggerState information element (IE) is used to configure a list of aperiodic trigger states to a UE. Each codepoint of a CSI request field of DCI is associated with one trigger state. Upon receiving a value associated with a trigger state by DCI, a UE performs measurement of a CSI-RS, a CSI-IM and/or SSB and a layer 1 (L1) aperiodic reporting according to all entries in a related report configuration list (i.e., associatedReportConfigInfoList).

A trigger state is initiated using a CSI request field in DCI. That is, a UE may measure reporting items in one or more CSI reporting configurations associated with a trigger state indicated by DCI, and report the measured result to a base station.

Before step S801 of FIG. 8, for each AP CSI-RS in a CSI-RS resource set associated with each CSI triggering state (or trigger state), a UE is indicated a QCL configuration of a QCL RS source(s) and a QCL type(s) through high layer signaling of QCL information (i.e., higher layer parameter qcl-info) including a reference list for a TCI state for an AP CSI-RS (i.e., the higher layer parameter TCI-state) associated with the CSI triggering state.

Here, when a state referenced in a list is configured with reference to an RS related to 'QCL-TypeD', the RS may be an SS/PBCH block located in the same or different component carrier (CC)/DL BWP, or a periodic or semi-persistent CSI-RS resource located in the same or different CC/DL BWP.

A UE receives an AP CSI-RS from a base station based on DCI (S802).

As described above, when a UE receives a value associated with a trigger state by DCI, the UE performs measurement of a CSI-RS, a CSI-IM and/or SSB and a layer 1 (L1) aperiodic reporting according to all entries in a related report configuration list (i.e., associatedReportConfigInfoList) for a corresponding trigger state. That is, when receiving an AP CSI-RS in a related report configuration list (i.e., associatedReportConfigInfoList) for a trigger state indicated by DCI, a UE may apply a QCL assumption for a corresponding AP CSI-RS (i.e., QCL configuration of QCL RS source(s) and QCL type(s)).

As in FIG. 8, i) when a value reported by a UE (i.e., a value of beamSwitchTiming) is one of {14, 28, 48}, if a scheduling offset between the last symbol of a PDCCH carrying the triggering DCI (i.e., step S801) and the first symbol of AP CSI-RS resources in an NZP-CSI-RS resource set configured without TRS information (i.e., high layer parameter trs-Info) is less than a threshold beam switching timing (beamSwitchTiming) reported by a UE, or ii) when a value reported by a UE (i.e., a value of beamSwitchTiming) is one of {224, 336}, if the scheduling offset is less than 48, a UE may apply the following QCL assumption (i.e., QCL configuration of QCL RS source(s) and QCL type(s)) when receiving a corresponding AP CSI-RS.

First, if there is any other downlink signal indicated with a TCI state within the same symbol as the CSI-RS (i.e., the AP CSI-RS in step S802), a UE may apply a QCL assumption of the other downlink signal when receiving the AP CSI-RS. Here, the other downlink signal may be i) a PDSCH scheduled with an offset equal to or greater than a time interval for a threshold QCL (i.e., higher layer parameter timeDurationForQCL), ii) an AP CSI-RS scheduled with an offset equal to or greater than a threshold beam switching timing (beamSwitchTiming) reported by a UE when a reported value (i.e., a value of beamSwitchTiming) by a UE is one of {14, 28, 48}, iii) an AP CSI-RS scheduled with an offset equal to or greater than 48, when a value (i.e., a value of beamSwitchTiming) reported by a UE is one of {224, 336}, iv) a periodic CSI-RS, or v) a semi-persistent CSI-RS.

Otherwise, when receiving the CSI-RS, a QCL assumption used for a CORESET with the lowest CORESET identifier (i.e., controlResourceSetId) associated with the monitored search space in the last (most recent) slot in one or more CORESET(s) monitored in an activated BWP of a serving cell may be applied.

Here, a beam switching timing (i.e., higher layer parameter beamSwitchTiming) indicates the minimum number of OFDM symbols between DCI triggering an AP CSI-RS and AP CSI-RS transmission. Here, the number of OFDM symbols is measured from the last symbol including an indication (i.e., the last symbol of DCI or a PDCCH carrying DCI) to the first symbol of a CSI-RS. A UE may include this field (i.e., beamSwitchTiming) in capability information for each supported subcarrier spacing and report the capability information to a base station.

In addition, a time interval for a QCL (i.e., higher layer parameter timeDurationForQCL) defines the minimum number of OFDM symbols required by a UE to perform PDCCH reception and to apply spatial QCL information received in DCI for PDSCH processing. A UE indicates one value of the minimum number of OFDM symbols for each subcarrier spacing of 60 kHz and 120 kHz.

A UE calculates/measures CSI based on the received AP CSI-RS (S803).

A UE reports the measured CSI to a base station (S804).

For CSI reporting, a time and/or frequency resource available to a UE are controlled by a base station.

CSI may include at least one of a channel quality indicator (CQI), a precoding matrix indicator (PMI), a CSI-RS resource indicator (CRI), an SS/PBCH block resource indicator (DDBRI), a layer indicator (LI), a rank indicator (RI), or a layer1 reference signal reception power (L1-RSRP).

Meanwhile, in case of a UE supporting a multi-DCI-based M-TRP transmission method in the current standardization, there are a UE capable of simultaneously receiving PDSCHs/PDCCHs/DL-RSs of different QCL type D using two default Rx beams at one moment (e.g., one timing, one slot, one symbol, etc.) and a UE that is not. Here, PDSCHs/PDCCHs/DL-RSs of different QCL type D may mean that reference signals of QCL type D having a QCL relationship with a DMRS of a PDSCH/a DMRS of a PDCCH/a DL-RS are different from each other, respectively. In addition, if reference signals of different QCL type D correspond to different TRPs, it may mean that a UE can simultaneously receive PDSCHs/PDCCHs/DL-RSs from different TRPs at one moment.

A UE may report to a base station whether it is possible to simultaneously receive PDSCHs/PDCCHs/DL-RSs of different QCL type D using two default Rx beams at one moment as UE capability. For example, a UE may report a beam switching timing (beamSwitchTiming) to a base station through UE capability.

As described above, if a UE can use two default Rx beams (at the same time), the following operation of determining a default beam when receiving an AP CSI-RS is being discussed.

In multi-DCI-based M-TRP, for an AP CSI-RS having a scheduling offset smaller than beamSwitchTiming, to determine an operation of a default TCI state (or QCL configuration/assumption), the following cases are considered:

Case 1: When there is any other known downlink signal(s) indicated with a TCI state in the same symbol as an AP CSI-RS:

Case 1-1: When there is 'any other known DL signal(s)' indicated with a TCI state in the same symbol as an AP CSI-RS, and the other downlink signal is associated with a different CORESET pool index from a PDCCH triggering an AP CSI-RS, Case 1-2: When there is any other known downlink signal(s) indicated with a TCI state in the same symbol as an AP CSI-RS, and the other downlink signal is associated with the same CORESET pool index as a PDCCH triggering an AP CSI-RS CORESET, Case 1-3: When there are two different downlink signals associated with two different CORESET pool indexes indicated with a TCI state in the same symbol as an AP CSI-RS, Case 1-4: When there is any other known downlink signal indicated with a TCI state in the same symbol as an AP CSI-RS, and the other downlink signal is not associated with any CORESET pool index, Case 2: When there is no other known downlink signal indicated with a TCI state in the same symbol as an AP CSI-RS:

The above-described operations may be applied only to a UE supporting a characteristic of a basic QCL assumption (i.e., a basic TCI state) for each CORESET pool index. If a UE supports the characteristic of the basic QCL assumption (i.e., the basic TCI state) for each CORESET pool index, the Rel-15 operation may be followed.

The known downlink signal(s) in the above-described Cases 1 and 2 may indicate a downlink signal(s) in the same band as the AP CSI-RS.

In this disclosure, a trigger state may be initiated by a CSI request field in DCI, and each AP CSI-RS resource may be associated with each CSI trigger state. Accordingly, DCI triggering an AP CSI-RS may be interpreted as DCI triggering aperiodic CSI.

Embodiment 1: When a CORESET pool index to which a CORESET of DCI (i.e., triggering DCI) triggering an AP CSI-RS belongs and a CORESET pool index associated with 'any other known DL signal' of Case 1 is the same, a UE may determine that a default beam for AP CSI-RS reception is the same reception beam as 'any other known DL signal' associated with the same CORESET pool index. That is, a UE may apply a QCL assumption (i.e., applying a spatial reception filter with reference to an RS configured with QCL type D) of the 'any other known DL signal' when receiving the AP CSI-RS.

In addition, when there is one or several 'any other known DL signal(s)', and when at least one of CORESET pool index(s) associated with 'any other known DL signal(s)' is the same as a CORESET pool index of triggering DCI, a default beam for AP CSI-RS reception may be determined as the same reception beam as 'any other known DL signal' associated with the same CORESET pool index. That is, a UE may apply a QCL assumption (i.e., applying a spatial reception filter with reference to an RS configured with QCL type D) of the 'any other known DL signal' when receiving the AP CSI-RS.

As a result, a UE may receive an AP CSI-RS using a QCL assumption (i.e., applying a spatial reception filter with reference to an RS configured with QCL type D) of a DL signal transmitted by the same TRP as a TRP that transmitted triggering DCI before beamSwitchTiming after receiving triggering DCI, and may store it in a buffer.

On the other hand, when a CORESET pool index associated with (all) 'any other known DL signal' is different from a CORESET pool index of triggering DCI, and/or when 'any other known downlink signal' is not associated with any CORESET pool index (e.g., periodic CSI-RS, semi-persistent CSI-RS, etc.), and/or when it is unclear which CORESET pool index it is associated with, the downlink signals may not be used for configuring a default beam for AP CSI-RS reception. In this case, a default beam for AP CSI-RS reception (i.e., default QCL assumption) may be determined as 'default beam behavior A' below.

For example, the Case 1-1/case 1-4 corresponds to this case, and in case of a plurality of 'any other known DL signal', when all of the corresponding downlink signals are associated with a different CORESET pool index from a CORESET pool index of triggering DCI and, and/or when all of the corresponding downlink signals are not associated with any CORESET pool index, and/or when it is unclear to which CORESET pool index all of the corresponding downlink signals are associated, a default beam for AP CSI-RS reception (i.e., default QCL assumption) may be determined as 'default beam behavior A' below. Alternatively, instead of 'default beam behavior A', 'default beam behavior B' may be applied in the same way as Rel-15.

In this way, when a TRP different from a TRP transmitting triggering DCI transmits a downlink signal or it is ambiguous which TRP transmits a downlink signal, since a TRP that has transmitted the triggering DCI does not know the downlink signal scheduling situation of other TRPs, it is preferable to allow a UE to determine a default beam regardless of downlink signals of other TRPs. If a default beam is determined with a downlink signal of another TRP, the TRP that transmitted the triggering DCI cannot know this situation, a problem occurs

[Default beam behavior A] When a UE receives an AP CSI-RS, in the last (most recent) slot in one or more CORESETs monitored in an active BWP of a serving cell, a QCL assumption used for a CORESET having the lowest identity (ID) (i.e., the lowest CORESET ID) and associated with a monitored search space among all CORESET(s) having the same CORESET pool index value as a CORESET for a PDCCH (or DCI) triggering the AP CSI-RS may be applied.

[Default beam behavior B] When a UE receives an AP CSI-RS, in the last (most recent) slot in one or more CORESETs monitored in an active BWP of a serving cell, a QCL assumption used for a CORESET having the lowest identity (ID) (i.e., the lowest CORESET ID) and associated with the monitored search space among all CORESET(s) may be applied.

The 'any other known downlink signal' may include various signals, for example, a PDSCH/PDCCH/DL-RS (e.g., periodic/semi-persistent/aperiodic CSI-RS, TRS, SSB), etc.

Alternatively, for example, considering that M-TRP transmission is applied to only a PDSCH, 'any other known downlink signal' may mean only a PDSCH limitedly. In this case, the same default beam operation as Rel-15 or the operation of the default beam behavior A may be followed for the remaining 'any other known DL signal' other than a PDSCH. That is, if this is extended and interpreted, for example, a basic beam operation performed by a UE may vary according to a type of a downlink signal (i.e., according to which downlink signal it is).

In addition, for example, the 'default beam' described in the present disclosure is substituted with a basic TCI state or a basic QCL RS or a default spatial relation RS or a default spatial reception filter, etc.

Embodiment 2: In case of a PDSCH/PDCCH, a CORESET pool index may be confirmed/determined in the following method. For example, a CORESET pool index associated with a PDSCH may correspond to a CORESET pool index of a CORESET to which DCI scheduling the PDSCH belongs (detected). Similarly, a CORESET pool index associated a the PDCCH may correspond to a CORESET pool index of a CORESET in which the corresponding PDCCH is defined (monitored). Since an AP CSI-RS is also scheduled/triggered through DCI like a PDSCH, it is possible to confirm/determine a CORESET pool index in a similar manner to a PDSCH. That is, a CORESET pool index associated with an AP CSI-RS may correspond to a CORESET pool index of a CORESET to which DCI that triggered the AP CSI-RS belongs (detected).

However, since a periodic (P)/semi-persistent (SP) CSI-RS or a TRS/SSB, etc. are not signals scheduled based on DCI, it is difficult to determine an associated CORESET pool (i.e., CORESET pool index) of a corresponding DL RS (e.g., P CSI-RS/SP CSI-RS/TRS/SSB, etc.). Therefore, this embodiment proposes a method for determining an associated CORESET pool (i.e., CORESET pool index).

According to the current standard, a TCI state for receiving a PDCCH DMRS of a CORESET may be configured for each CORESET. For example, up to 64 TCI state candidates (i.e., TCI state pool) may be configured for each CORESET, by linking one of them with a CORESET through MAC CE activation (e.g., through a TCI state indication MAC CE for a UE-specific PDCCH), a final TCI state for receiving a PDCCH DMRS is configured. Alternatively, in some cases, this TCI state pool is not configured, and an SSB identified through the latest initial access/random access channel (RACH) may be configured as a QCL RS of a CORESET. For example, this corresponds to the case where a TCI state of CORESET 0 is configured or a TCI state of a CORESET is not configured by RRC.

As described above, for a specific CORESET, when a TCI state applicable to a corresponding CORESET (i.e., a specific TCI state identifier) is indicated, a QCL type and/or QCL source RS for a PDCCH DMRS monitored in the corresponding CORESET may be configure by the indicated TCI state (i.e., the TCI state identified by the corresponding TCI state identifier).

According to an embodiment of the present disclosure, a UE may identify a QCL RS used in a CORESET belonging to each CORESET pool, and may identify/consider the QCL RS and/or other RS(s) in which the QCL RS is configured as a QCL source RS (or QCL reference RS) as associated with a corresponding CORESET pool index.

For example, when CORESET 0, 1 is configured with CORESET pool index=0 and CORESET 2, 3 is configured with CORESET pool index=1 for a UE, it may be assumed that a QCL RS used in each CORESET is configured as in the example below. The following examples are only examples for convenience of description, and do not limit the technical scope of the present disclosure.

Example) i) CORESET pool index=0
CORESET 0: QCL RS=CSI-RS 0
CORESET 1: QCL RS=TRS 0
ii) CORESET pool index=1
CORESET 2: QCL RS=CSI-RS 1
CORESET 3: QCL RS=TRS 1

When configured as above, CSI-RS 0, TRS 0 and/or one or more DL RSs for which CSI-RS 0, TRS 0 is configured as a QCL source RS (with QCL) may all be associated with CORESET pool index=0. For example, it is assumed that a QCL source RS of {CSI-RS 3, 4, 5, TRS 2, 3} is included in {CSI-RS 0, TRS 0}. In this case, a UE may determine that {CSI-RS 0, TRS 0} is associated with CORESET pool index=0, or may determine that {CSI-RS 3, 4, 5, TRS 2, 3} is associated with CORESET pool index=0, or may determine that {CSI-RS 0, TRS 0, CSI-RS 3, 4, 5, TRS 2, 3} is associated with CORESET pool index=0.

In addition, CSI-RS 1, TRS 1 and/or one or more DL RSs for which CSI-RS 1, TRS 1 is configured as a QCL source RS may all be associated with CORESET pool index=1. For example, it is assumed that a QCL source RS of {CSI-RS 6, 7, 8, TRS 4, 5} is included in {CSI-RS 1, TRS 1}. In this case, a UE may determine that {CSI-RS 1, TRS 1} is associated with CORESET pool index=1, or may determine that {CSI-RS 6, 7, 8, TRS 4, 5} is associated with CORESET pool index=1, or may determine that {CSI-RS 1, TRS 1, CSI-RS 6, 7, 8, TRS 4, 5} is associated with CORESET pool index=1.

In the above proposal, a QCL RS (i.e., CSI-RS 0 for CORESET 0, TRS 0 for CORESET 1, CSI-RS 1 for CORESET 2, TRS 1 for CORESET 3) used in a CORESET means a specific QCL RS actually used for receiving a PDCCH DMRS of the CORESET. That is, if a TCI state applicable to a corresponding CORESET is indicated through MAC CE activation (e.g., through a TCI state indication MAC CE for a UE-specific PDCCH) among a TCI state pool configured for each CORESET, a QCL source RS configured by the indicated TCI state (i.e., the TCI state identified by the corresponding TCI state identifier) may mean a specific QCL RS actually used for PDCCH DMRS reception of the CORESET.

As a result, a QCL RS used in a CORESET and/or other DL RSs for which the RS is configured as a QCL source RS may be only a part of all DL RSs used in an activated BWP of a corresponding cell. Therefore, a CORESET pool index of the remaining DL RS may still be ambiguous. Therefore, when determining a QCL RS used in each CORESET, it is desirable to consider a TCI state pool (up to 64 TCI state candidates) configured in the CORESET by RRC in addition to a specific QCL RS actually used for receiving a PDCCH DMRS of the CORESET.

For example, when CORESET 0, 1 is configured with CORESET pool index=0 and CORESET 2, 3 is configured with CORESET pool index=1 for a UE, it may be assumed that a QCL RS actually used in each CORESET and a TCI state pool configured by RRC are configured as in the example below. The following examples are only examples for convenience of description, and do not limit the technical scope of the present disclosure.

Example) i) CORESET pool index=0
CORESET 0: QCL RS={CSIRS 0, 1, 2, 3, 4, 5, 6, 7, 8, 9, TRS 0, SSB 0}
CORESET 1: QCL RS={TRS 1, TRS 2, SSB 1, SSB 2}
ii) CORESET pool index=1
CORESET 2: QCL RS={CSIRS 10, 11, 12, 13, 14, 15, 16, 17, 18, 19, TRS 3, SSB 3}
CORESET 3: QCL RS={TRS 4, TRS 5, SSB 4, SSB 5}

When configured as above, CSI-RS 0, 1, 2, 3, 4, 5, 6, 7, 8, 9, TRS 0, TRS 1, TRS 2, SSB 0, SSB 1, SSB 2} and/or one or more DL RSs for which {CSI-RS 0, 1, 2, 3, 4, 5, 6, 7, 8, 9, TRS 0, TRS 1, TRS 2, SSB 0, SSB 1, SSB 2} is configured as a QCL source RS may all be associated with CORESET pool index=0. For example, it is assumed that a QCL source RS of {CSI-RS 20, 21, 22, TRS 6, 7} is included in {CSI-RS 0, 1, 2, 3, 4, 5, 6, 7, 8, 9, TRS 0, TRS 1, TRS 2, SSB 0, SSB 1, SSB 2}. In this case, a UE may determine that {CSI-RS 0, 1, 2, 3, 4, 5, 6, 7, 8, 9, TRS 0, TRS 1, TRS 2, SSB 0, SSB 1, SSB 2} is associated with CORESET pool index=0, or may determine that {CSI-RS 20, 21, 22, TRS 6, 7} is associated with CORESET pool index=0, or may determine that {CSI-RS 0, 1, 2, 3, 4, 5, 6, 7, 8, 9, TRS 0, TRS 1, TRS 2, SSB 0, SSB 1, SSB 2, CSI-RS 20, 21, 22, TRS 6, 7} is associated with CORESET pool index=0.

In addition, {CSI-RS 10, 11, 12, 13, 14, 15, 16, 17, 18, 19, TRS 3, TRS 4, TRS 5, SSB 3, SSB 4, SSB 5} and/or one or more DL RSs for which {CSI-RS 10, 11, 12, 13, 14, 15, 16, 17, 18, 19, TRS 3, TRS 4, TRS 5, SSB 3, SSB 4, SSB 5} is configured as a QCL source RS may all be associated with CORESET pool index=1. For example, it is assumed that a QCL source RS of {CSI-RS 23, 24, 25, TRS 8, 9, 10} is included in {CSI-RS 10, 11, 12, 13, 14, 15, 16, 17, 18, 19, TRS 3, TRS 4, TRS 5, SSB 3, SSB 4, SSB 5}. In this case, a UE may determine that {CSI-RS 10, 11, 12, 13, 14, 15, 16, 17, 18, 19, TRS 3, TRS 4, TRS 5, SSB 3, SSB 4, SSB 5} is associated with CORESET pool index=1, or may determine that {CSI-RS 23, 24, 25, TRS 8, 9, 10} is associated with CORESET pool index=1, or may determine that {CSI-RS 10, 11, 12, 13, 14, 15, 16, 17, 18, 19, TRS 3, TRS 4, TRS 5, SSB 3, SSB 4, SSB 5, CSI-RS 23, 24, 25, TRS 8, 9, 10} is associated with CORESET pool index=1.

In other words, based on at least one of a QCL RS or a TCI state pool (i.e., QCL RSs configured in a TCI state pool) configured by RRC corresponding to each CORESET, an associated CORESET pool index of a DL RS (e.g., P CSI-RS/SP CSI-RS/TRS/SSB, etc.) may be determined.

As an associated CORESET pool index of a DL RS (e.g., P CSI-RS/SP CSI-RS/TRS/SSB, etc.) is determined in the same method as above, the method of Embodiment 1 may be equally applied.

For example, when a CORESET pool index to which a CORESET of DCI triggering an AP CSI-RS belongs and a CORESET pool index associated with 'any other known DL signal' are same, a UE may determine that a default beam for AP CSI-RS reception is the same reception beam as 'any other known DL signal' associated with the same CORESET pool index. In addition, when there is one or several any other known downlink signals, and when at least one of CORESET pool index(s) associated with 'any other known DL signal(s)' is the same as a CORESET pool index of triggering DCI, a default beam for AP CSI-RS reception may be determined as the same reception beam as 'any other known DL signal' associated with the same CORESET pool index. In addition, even if the method of Embodiment 2 above is applied, when there is no 'any other known DL signal' associated with a CORESET pool index identical to a CORESET pool index of triggering DCI, the above-described 'default beam behavior A' or 'default beam behavior B' may be applied to determine a default beam for AP CSI-RS reception (i.e., default QCL assumption).

Figure 9:
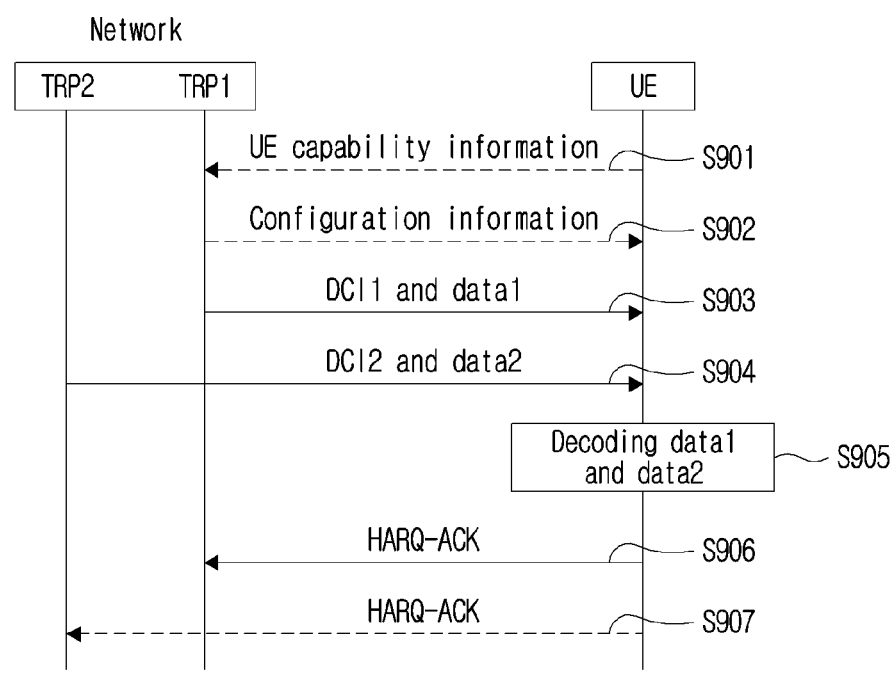
FIG. 9 illustrates a signaling procedure between a network and a terminal according to an embodiment of the present disclosure.

FIG. 9 illustrates a signaling procedure between a network and a terminal according to an embodiment of the present disclosure.

The after-described FIG. 9 illustrates signaling between a network (e.g., TRP 1, TRP 2) and a terminal (i.e., UE) in a situation of multiple TRPs (i.e., M-TRPs, or multiple cells, hereinafter, all TRPs may be replaced with a cell) that methods proposed in the present disclosure (e.g., Embodiment 1/Embodiment 2) may be applied.

Figure 12:
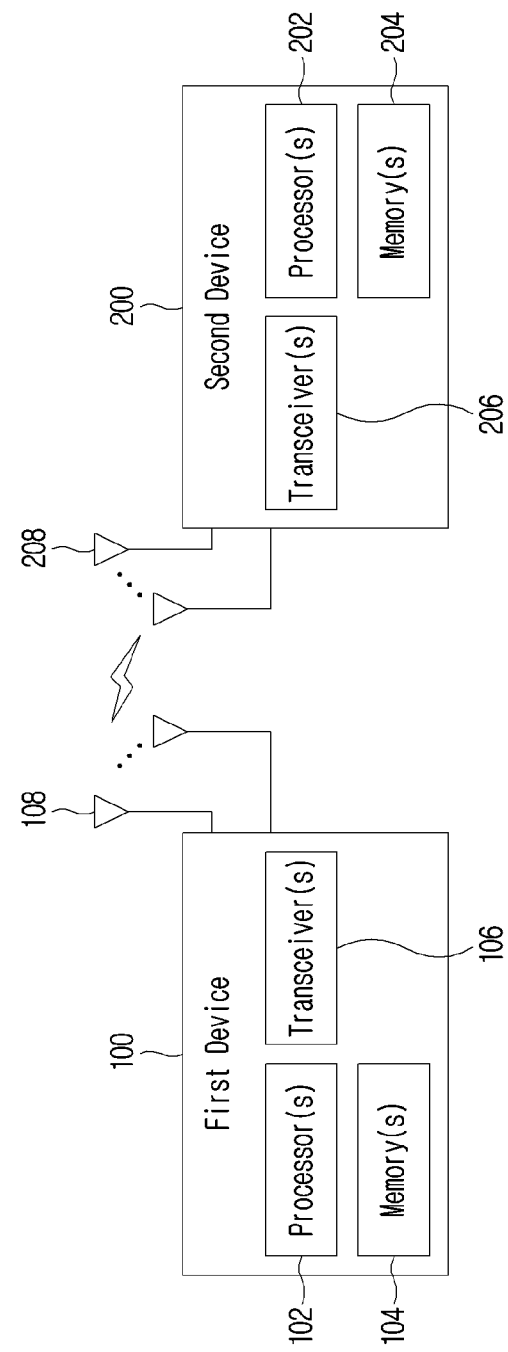
FIG. 12 illustrates a block diagram of a wireless communication device according to an embodiment of the present disclosure.

Here, UE/a network is just an example, and may be applied by being substituted with a variety of devices as described in the after-described FIG. 12. FIG. 9 is just for convenience of a description, and do not limit a scope of the present disclosure. In addition, some step(s) shown in FIG. 9 may be omitted according to a situation and/or a configuration, etc.

In reference to FIG. 9, for convenience of a description, signaling between 2 TRPs and UE is considered, but a corresponding signaling method may be extended and applied to signaling between multiple TRPs and multiple UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on multiple TRPs, but it may be equally extended and applied to transmission through multiple panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be inversely interpreted/described.

In addition, as described above, a "TRP" may be applied by being substituted with an expression such as a panel, an antenna array, a cell (e.g., a macro cell/a small cell/a pico cell, etc.), a TP (transmission point), a base station (gNB, etc.), etc. As described above, a TRP may be classified according to information on a CORESET group (or a CORESET pool) (e.g., an index, an identifier (ID)). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, a base station may generally mean an object which performs transmission and reception of data with a terminal.

Specifically, FIG. 9 represents signaling for a case in which a terminal receives multiple DCI (e.g., when each TRP transmits DCI to UE) in a situation of M-TRPs (or, a cell, hereinafter, all TRPs may be substituted with a cell, or even when a plurality of CORESETs are configured from one TRP, it may be assumed as M-TRPs).

Referring to FIG. 9, a UE may transmit UE capability information through/using TRP 1 (and/or TRP 2) to a network (S901). For example, the UE capability may include information related to capability for a UE operation (e.g., beam switching timing (beamswitchingTiming)/time duration for QCL (timeDurationForQCL), etc.) and/or information on whether a UE can use two (default) Rx beams (at the same time), etc. In addition, the step of transmitting the UE capability may be omitted in some cases.

In reference to FIG. 9, a UE may receive configuration information on Multiple TRP-based transmission and reception through/with TRP 1 (and/or TRP 2) from a Network (S902).

The configuration information may include information related to a configuration of a network (i.e., a TRP configuration), resource (resource allocation) information related to Multiple TRP-based transmission and reception, etc. Here, the configuration information may be transmitted through higher layer signaling (e.g., RRC signaling, MAC-CE, etc.). In addition, when the configuration information is predefined or preconfigured, a corresponding step may be omitted.

For example, the configuration information may include configuration information related to M-TRP transmission, as described in the above-described proposed method (e.g., Embodiment 1/Embodiment 2, etc.). For example, the configuration information may include configuration information on a CORESET/COREST group (or CORESET pool) related to the network (e.g., TRP 1/TRP 2) and/or configuration information related to a TCI state (here, the configuration information related to a TCI state may include QCL configuration information for a PDCCH DMRS antenna port monitored/received in a corresponding CORESET/CORESET group) for each CORESET/CORESET group, etc. For example, a TCI state candidate (e.g., TCI state pool) may be configured for each CORESET through RRC signaling, and a specific TCI state may be activated/deactivated through MAC CE signaling.

A UE may receive DCI 1 and data 1 scheduled by the corresponding DCI 1 through/using TRP 1 from a network (S903). In addition, a UE may receive DCI 2 and data 2 scheduled by the corresponding DCI 2 through/using TRP 2 from the network (S904).

DCI (e.g., DCI 1, DCI 2) and Data (e.g., Data 1, Data 2) may be transmitted through a control channel (e.g., a PDCCH, etc.) and a data channel (e.g., a PDSCH, etc.), respectively. For example, the control channel (e.g., a PDCCH) may be repetitively transmitted or the same control channel may be partitively transmitted. In addition, Step S903 and Step S904 may be performed simultaneously or any one may be performed earlier than the other.

For example, the DCI 1/DCI 2 may include information triggering an AP CSI-RS/(indication) information for a TCI state (e.g., TCI field)/resource allocation information for the TCI state (e.g., bandwidth)/resource allocation information (i.e., spatial/frequency/time resources) for data (e.g., data 1/2), etc. described in the above-described proposed method (e.g., Embodiment 1/Embodiment 2, etc.).

For example, although not shown in FIG. 9, after a UE receives DCI (e.g., triggering DCI) triggering an AP CSI-RS, the UE may receive an AP CSI-RS indicated with a scheduling offset smaller than a beam switching timing (beamswitchingTiming).

In this case, a reception beam (i.e., default beam) of an AP CSI-RS may be determined based on the above-described proposed methods (e.g., Embodiment 1/Embodiment 2, etc.). For example, a reception beam of an AP CSI-RS (i.e., a default beam) may be determined as the same reception beam as a downlink signal (e.g., any other known DL signal) associated with a CORESET having the same CORESET pool index as a CORESET pool index including (corresponding to) a CORESET of triggering DCI (i.e., CORESET where the triggering DCI (PDCCH carrying the DCI) is monitored/received). That is, a UE may apply a QCL assumption to the downlink signal (e.g., any other known DL signal) in order to receive the AP CSI-RS.

Alternatively, a UE may apply the above-described default beam behavior A. For example, a UE may apply a QCL assumption used for a CORESET having the lowest CORESET ID and associated with the monitored search space to receive the AP CSI-RS among all CORESET(s) having the same CORESET pool index value as a CORESET for a PDCCH (or DCI) triggering the AP CSI-RS. Alternatively, a UE may apply the above-described default beam behavior B. For example, a UE may apply a QCL assumption used for a CORESET having the lowest CORESET ID and associated with the monitored search space among all CORESET(s) to receive the AP CSI-RS and.

For example, the downlink signal (e.g., any other known DL signal) may include a PDSCH/PDCCH/DL-RS (e.g., CSI-RS, TRS, SSB, etc.), etc. In addition, as described above, an operation of determining a default beam may vary according to, for example, a type of the DL signal.

A UE may decode data 1 and data 2 received from TRP 1 and TRP 2 (S905). For example, as described in the above-described proposed method (e.g., Embodiment 1/Embodiment 2, etc.), a UE may decode the data 1/data 2 based on resource allocation of a PDSCH to which each data is transmitted.

For example, as described in the above-described proposed methods (e.g., Embodiment 1/Embodiment 2, etc.), a CORESET pool index associated with a DL RS (e.g., P CSI-RS/SP CSI-RS/TRS/SSB) etc.) may be determined as a CORESET pool index associated with a corresponding QCL RS and/or another RS for which a corresponding QCL RS is configured as a QCL source RS.

A UE may transmit HARQ-ACK information (e.g., ACK information, NACK information, etc.) for the data 1 and/or data 2 to a network through/using TRP 1 and/or TRP 2 (S906, S907). In this case, HARQ-ACK information for data 1 and data 2 may be combined into one. In addition, a UE is configured to transmit only HARQ-ACK information to a representative TRP (e.g., TRP 1), and transmission of HARQ-ACK information to another TRP (e.g., TRP 2) may be omitted.

The above-described Network/UE signaling and operation (e.g., Embodiment 1/Embodiment 2/FIG. 9) may be implemented by a device (e.g., FIG. 12) which will be described below. For example, a Network (e.g., TRP 1/TRP 2) may correspond to a first wireless device and UE may correspond to a second wireless device and in some cases, the opposite may be considered.

For example, the above-described Network/UE signaling and operation (e.g., Embodiment 1/Embodiment 2/FIG. 9) may be processed by one or more processors in FIG. 12 (e.g., 102, 202). In addition, the above-described Network/UE signaling and operation (e.g., Embodiment 1/Embodiment 2/FIG. 9) may be stored in a memory (e.g., one or more memories in FIG. 12 (e.g., 104, 204)) in a form of a command/a program (e.g., an instruction, an executable code) for driving at least one processor in FIG. 16 (e.g., 102, 202).

For example, although FIG. 9 has focused on the multi-DCI-based M-TRP operation, it may also be applied to the single DCI-based M-TRP operation. For example, in the case of single DCI-based M-TRP operation, a CORESET pool index to which a CORESET of DCI triggering an AP CSI-RS belongs and a CORESET pool index associated with 'any other known DL signal' are the same, a default beam for AP CSI-RS reception may be determined as the same reception beam as 'any other known DL signal' associated with the same CORESET pool index.

Figure 10:
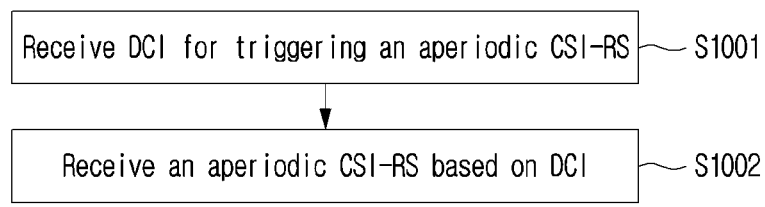
FIG. 10 illustrates an operation of a terminal for transmitting and receiving of an aperiodic CSI-RS according to an embodiment of the present disclosure.

FIG. 10 illustrates an operation of a terminal for transmitting and receiving of an aperiodic CSI-RS according to an embodiment of the present disclosure.

FIG. 10 illustrates an operation of a terminal based on the Embodiment 1/Embodiment 2. An example in FIG. 10 is for convenience of a description, and it does not limit a scope of the present disclosure. Some step(s) illustrated in FIG. 10 may be omitted according to a situation and/or a configuration. In addition, a terminal is just one example in FIG. 10, and may be implemented by a device illustrated in the following FIG. 12. For example, a processor 102/202 in FIG. 12 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 10 may be processed by one or more processors 102 and 202 in FIG. 12. In addition, an operation in FIG. 10 may be stored in a memory (e.g., one or more memories 104 and 204 in FIG. 12) in a form of a command/a program (e.g., an instruction, an executable code) for driving at least one processor in FIG. 12 (e.g., 102, 202).

Although not shown in FIG. 10, a terminal may transmit terminal capability (UE capability) information to a base station. Here, the terminal capability information may include information related to capability for a terminal operation (e.g., beam switching timing (beamswitchingTiming)/time duration for QCL (timeDurationForQCL), etc.) and/or information on whether a terminal can use two (default) Rx beams (at the same time), etc.

In addition, although not shown in FIG. 10, a terminal may receive configuration information for a CORESET/COREST group (or CORESET pool) and/or configuration information related to a TCI state (here, the configuration information related to a TCI state may include QCL configuration information for a PDCCH DMRS antenna port monitored/received in a corresponding CORESET/CORESET group) for each CORESET/CORESET group from a base station. Here, TCI state candidates (e.g., TCI state pool) may be configured for each CORESET through RRC signaling, and a specific TCI state may be activated/deactivated through MAC CE signaling.

A terminal receives DCI (or PDCCH) triggering an aperiodic CSI-RS from a base station (S1001).

Here, DCI (or PDCCH) may be transmitted from any one TRP in a system supporting M-TRP. In addition, DCI (or PDCCH) may be received in a CORESET configured in the terminal.

The DCI may include information triggering an AP CSI-RS/(indication) information for a TCI state (e.g., TCI field)/resource allocation information for the TCI state (e.g., bandwidth)/resource allocation information (i.e., spatial/frequency/time resources) for data (e.g., data 1/2), etc.

A terminal receives the aperiodic CSI-RS based on the DCI (S1002).

Here, when a scheduling offset of the aperiodic CSI-RS is smaller than a beam switch timing of the terminal, the terminal may perform the same operation as in Embodiment 1 above.

Specifically, a QCL assumption of a downlink signal associated with the same CORESET pool index as a CORESET pool index of a CORESET for the DCI may be applied for reception of the aperiodic CSI-RS. That is, a reception beam of the aperiodic CSI-RS may be determined as the same reception beam as a downlink signal associated with the same CORESET pool index as a CORESET pool index of a CORESET for the DCI.

In addition, when one or more downlink signals exist in the same symbol as the aperiodic CSI-RS, a QCL assumption of a downlink signal associated with the same CORESET pool index as a CORESET pool index of a CORESET for the DCI among the one or more downlink signals may be applied for reception of the aperiodic CSI-RS.

On the other hand, when one or more downlink signals do not exist in the same symbol as the aperiodic CSI-RS or all of the one or more downlink signals are not associated with the same CORESET pool index as a CORESET pool index of a CORESET for the DCI, a default beam behavior A or a default beam behavior B described above may be applied. Specifically, a QCL assumption used for a CORESET having the lowest CORESET identity (ID) among all CORESETs having the same CORESET pool index as a CORESET pool index of a CORESET for the DCI may be applied for reception of the aperiodic CSI-RS. A QCL assumption used for a CORESET having the lowest CORESET identity (ID) among all monitored CORESETs may be applied for reception of the aperiodic CSI-RS.

Here, the downlink signal may include a PDSCH, a PDCCH, and a downlink reference signal (e.g., CSI-RS, TRS, SSB, etc.).

In addition, as in Embodiment 2 above, a CORESET pool index associated with the downlink signal may be determined based on a transmission configuration indication (TCI) state used for a specific CORESET or a TCI state pool set for the specific CORESET.

Specifically, when the downlink signal is a QCL reference signal configured by a TCI state used for the specific CORESET, a CORESET pool index associated with the downlink signal may be determined as a CORESET pool index of the specific CORESET. Alternatively, when a QCL reference signal configured by a TCI state used for the specific CORESET for the downlink signal is configured as a QCL source reference signal, a CORESET pool index associated with the downlink signal may be determined as a CORESET pool index of the specific CORESET.

In addition, when the downlink signal is included in QCL reference signals configured by a TCI state pool configured for the specific CORESET, a CORESET pool index associated with the downlink signal may be determined as a CORESET pool index of the specific CORESET. Alternatively, when any one of QCL reference signals configured by a TCI state pool configured for the specific CORESET for the downlink signal is configured as a QCL source reference signal, a CORESET pool index associated with the downlink signal may be determined as a CORESET pool index of the specific CORESET.

Although not shown in FIG. 10, a terminal may calculate/measure CSI based on the received AP CSI-RS and report the measured CSI to a base station.

Figure 11:
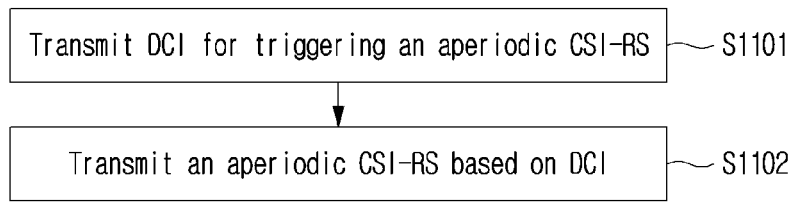
FIG. 11 illustrates an operation of a base station for transmitting and receiving of an aperiodic CSI-RS according to an embodiment of the present disclosure.

FIG. 11 illustrates an operation of a base station for transmitting and receiving of an aperiodic CSI-RS according to an embodiment of the present disclosure.

FIG. 11 illustrates an operation of a base station based on the Embodiment 1/Embodiment 2. An example in FIG. 11 is for convenience of a description, and it does not limit a scope of the present disclosure. Some step(s) illustrated in FIG. 11 may be omitted according to a situation and/or a configuration. In addition, a base station is just one example in FIG. 11, and may be implemented by a device illustrated in the following FIG. 12. For example, a processor 102/202 in FIG. 12 may be controlled to transmit and receive a channel/a signal/data/information, etc. by using a transceiver 106/206 and may be also controlled to store a channel/a signal/data/information, etc. which will be transmitted or received in a memory 104/204.

In addition, an operation in FIG. 11 may be processed by one or more processors 102 and 202 in FIG. 12. In addition, an operation in FIG. 11 may be stored in a memory (e.g., one or more memories 104 and 204 in FIG. 12) in a form of a command/a program (e.g., an instruction, an executable code) for driving at least one processor in FIG. 12 (e.g., 102, 202).

Although not shown in FIG. 11, a base station may receive terminal capability (UE capability) information from a terminal. Here, the terminal capability information may include information related to capability for a terminal operation (e.g., beam switching timing (beamswitchingTiming)/time duration for QCL (timeDurationForQCL), etc.) and/or information on whether a terminal can use two (default) Rx beams (at the same time), etc.

In addition, although not shown in FIG. 11, a base station may transmit configuration information for a CORESET/COREST group (or CORESET pool) and/or configuration information related to a TCI state (here, the configuration information related to a TCI state may include QCL configuration information for a PDCCH DMRS antenna port monitored/received in a corresponding CORESET/CORESET group) for each CORESET/CORESET group to a terminal. Here, TCI state candidates (e.g., TCI state pool) may be configured for each CORESET through RRC signaling, and a specific TCI state may be activated/deactivated through MAC CE signaling.

A base station transmits DCI (or PDCCH) triggering an aperiodic CSI-RS to a terminal (S1101).

Here, in a system supporting M-TRP, any one base station (i.e., any one TRP) may transmit DCI (or PDCCH). In addition, DCI (or PDCCH) may be transmitted in a CORESET configured in the terminal.

The DCI may include information triggering an AP CSI-RS/(indication) information for a TCI state (e.g., TCI field)/resource allocation information for the TCI state (e.g., bandwidth)/resource allocation information (i.e., spatial/frequency/time resources) for data (e.g., data 1/2), etc.

A base station transmits the aperiodic CSI-RS to a terminal (S1102).

Here, when a scheduling offset of the aperiodic CSI-RS is smaller than a beam switch timing of the terminal, the terminal may perform the same operation as in Embodiment 1 above.

Specifically, a QCL assumption of a downlink signal associated with the same CORESET pool index as a CORESET pool index of a CORESET for the DCI may be applied for reception of the aperiodic CSI-RS. That is, a reception beam of the aperiodic CSI-RS may be determined as the same reception beam as a downlink signal associated with the same CORESET pool index as a CORESET pool index of a CORESET for the DCI.

In addition, when one or more downlink signals exist in the same symbol as the aperiodic CSI-RS, a QCL assumption of a downlink signal associated with the same CORESET pool index as a CORESET pool index of a CORESET for the DCI among the one or more downlink signals may be applied for reception of the aperiodic CSI-RS.

On the other hand, when one or more downlink signals do not exist in the same symbol as the aperiodic CSI-RS or all of the one or more downlink signals are not associated with the same CORESET pool index as a CORESET pool index of a CORESET for the DCI, a default beam behavior A or a default beam behavior B described above may be applied. Specifically, a QCL assumption used for a CORESET having the lowest CORESET identity (ID) among all CORESETs having the same CORESET pool index as a CORESET pool index of a CORESET for the DCI may be applied for reception of the aperiodic CSI-RS. A QCL assumption used for a CORESET having the lowest CORESET identity (ID) among all monitored CORESETs may be applied for reception of the aperiodic CSI-RS.

Here, the downlink signal may include a PDSCH, a PDCCH, and a downlink reference signal (e.g., CSI-RS, TRS, SSB, etc.).

In addition, as in Embodiment 2 above, a CORESET pool index associated with the downlink signal may be determined based on a transmission configuration indication (TCI) state used for a specific CORESET or a TCI state pool set for the specific CORESET.

Specifically, when the downlink signal is a QCL reference signal configured by a TCI state used for the specific CORESET, a CORESET pool index associated with the downlink signal may be determined as a CORESET pool index of the specific CORESET. Alternatively, when a QCL reference signal configured by a TCI state used for the specific CORESET for the downlink signal is configured as a QCL source reference signal, a CORESET pool index associated with the downlink signal may be determined as a CORESET pool index of the specific CORESET.

In addition, when the downlink signal is included in QCL reference signals configured by a TCI state pool configured for the specific CORESET, a CORESET pool index associated with the downlink signal may be determined as a CORESET pool index of the specific CORESET. Alternatively, when any one of QCL reference signals configured by a TCI state pool configured for the specific CORESET for the downlink signal is configured as a QCL source reference signal, a CORESET pool index associated with the downlink signal may be determined as a CORESET pool index of the specific CORESET.

Although not shown in FIG. 11, a base station may receive CSI calculated/measured based on the AP CSI-RS received by a terminal from the terminal.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
    receiving, by a terminal from a base station, downlink control information for triggering an aperiodic channel state information-reference signal (CSI-RS); and
    receiving, from the base station, the aperiodic CSI-RS based on the downlink control information,
    wherein based on a scheduling offset of the aperiodic CSI-RS being smaller than a beam switch timing of the terminal, a quasi co-location (QCL) assumption of a downlink signal associated with the same control resource set pool index as a control resource set pool index of a control resource set for the downlink control information is applied for reception of the aperiodic CSI-RS,
    wherein the downlink signal is a periodic or semi-persistent downlink signal, and
    wherein based on the downlink signal being included in at least i) QCL reference signals configured for one or more control resource sets with the control resource set pool index or ii) other reference signals where the QCL reference signals are configured as QCL source reference signals, the downlink signal is determined to be associated with the control resource set pool index.

2. The method of claim 1, wherein when one or more downlink signals exist in the same symbol as the aperiodic CSI-RS, the QCL assumption of the downlink signal associated with the same control resource set pool index as the control resource set pool index of the control resource set for the downlink control information among the one or more downlink signals is applied for the reception of the aperiodic CSI-RS.

3. The method of claim 2, wherein when one or more downlink signals do not exist in the same symbol as the aperiodic CSI-RS, or when all of the one or more downlink signals are not associated with the same control resource set pool index as the control resource set pool index of the control resource set for the downlink control information, a QCL assumption used for a control resource set having the lowest control resource set identifier (ID) among all control resource sets having the same control resource set pool index as the control resource set pool index of the control resource set for the downlink control information is applied for the reception of the aperiodic CSI-RS.

4. The method of claim 2, when one or more downlink signals do not exist in the same symbol as the aperiodic CSI-RS, or when all of the one or more downlink signals are not associated with the same control resource set pool index as the control resource set pool index of the control resource set for the downlink control information, a QCL assumption used for a control resource set having the lowest control resource set identifier (ID) among all monitored control resource sets is applied for the reception of the aperiodic CSI-RS.

5. The method of claim 1, wherein the downlink signal includes a physical downlink shared channel, a physical downlink control channel, and a downlink reference signal.

6. The method of claim 1, wherein the control resource set pool index associated with the downlink signal is determined based on a transmission configuration indication (TCI) state used for a specific control resource set or a TCI state pool configured for the specific control resource set.

7. The method of claim 6, wherein when the downlink signal is included in QCL reference signals configured by the TCI state pool configured for the specific control resource set, the control resource set pool index associated with the downlink signal is determined as a control resource set pool index of the specific control resource set.

8. The method of claim 6, wherein when any one of QCL reference signals configured by the TCI state pool configured for the specific control resource set for the downlink signal is configured as a QCL source reference signal, the control resource set pool index associated with the downlink signal is determined as a control resource set pool index of the specific control resource set.

9. The method of claim 1, wherein when the downlink signal is a QCL reference signal configured by a transmission configuration indication (TCI) state used for a specific control resource set, the control resource set pool index associated with the downlink signal is determined as a control resource set pool index of the specific control resource set.

10. A terminal comprising:
at least one transceiver for transmitting and receiving a wireless signal; and
at least one processor for controlling the at least one transceiver,
wherein the at least one processor is configured to:
receive, from a base station, downlink control information for triggering an aperiodic channel state information-reference signal (CSI-RS); and
receive, from the base station, the aperiodic CSI-RS based on the downlink control information,
wherein based on a scheduling offset of the aperiodic CSI-RS being smaller than a beam switch timing of the terminal, a quasi co-location (QCL) assumption of a downlink signal associated with the same control resource set pool index as a control resource set pool index of a control resource set for the downlink control information is applied for reception of the aperiodic CSI-RS,
wherein the downlink signal is a periodic or semi-persistent downlink signal, and
wherein based on the downlink signal being included in at least i) QCL reference signals configured for one or more control resource sets with the control resource set pool index or ii) other reference signals where the QCL reference signals are configured as QCL source reference signals, the downlink signal is determined to be associated with the control resource set pool index.

11. A processing apparatus configured to control a terminal, the processing apparatus comprising:
at least one processor; and
at least one computer memory operably connected to the at least one processor and storing instructions that, based on being executed by the at least one processor, perform operations comprising:
receiving, from a base station, downlink control information for triggering an aperiodic channel state information-reference signal (CSI-RS); and
receiving, from the base station, the aperiodic CSI-RS based on the downlink control information,
wherein based on a scheduling offset of the aperiodic CSI-RS being smaller than a beam switch timing of the terminal, a quasi co-location (QCL) assumption of a downlink signal associated with the same control resource set pool index as a control resource set pool index of a control resource set for the downlink control information is applied for reception of the aperiodic CSI-RS,
wherein the downlink signal is a periodic or semi-persistent downlink signal, and
wherein based on the downlink signal being included in at least i) QCL reference signals configured for one or more control resource sets with the control resource set pool index or ii) other reference signals where the QCL reference signals are configured as QCL source reference signals, the downlink signal is determined to be associated with the control resource set pool index.

* * * * *